Figure 1:
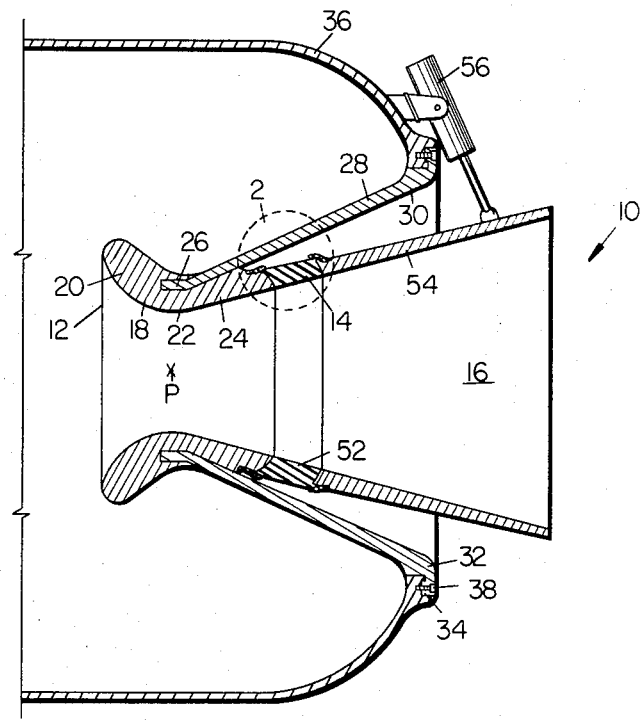

United States Patent

Desjardins et al.

[15] 3,696,999

[45] Oct. 10, 1972

[54] MOVABLE THRUST NOZZLE FOR ROCKETS

[72] Inventors: Stanley P. Desjardins, Brigham City; Alan R. Canfield, North Ogden; Jonathan W. Wilson, Brigham City, all of Utah

[73] Assignee: Thiokol Chemical Corporation, Bristol, Pa.

[22] Filed: July 17, 1967

[21] Appl. No.: 653,764

[52] U.S. Cl..............................239/265.35, 60/232
[51] Int. Cl..............................................B64c 15/04
[58] Field of Search..................239/265.35, 265.43

[56] References Cited

UNITED STATES PATENTS 3,258,915   7/1966   Goldberg..............239/265.43

*Primary Examiner*—Samuel Feinberg
*Attorney*—Edward E. McCullough

[57] ABSTRACT

A thrust nozzle of the hollow-cone type, fixed to the aft closure of the rocket. An annular portion of the divergent cone being constructed of rigid laminae bonded to interposed layers of elastomer functions not only as a part of the expansion surface of the nozzle but also as a flexible bearing to permit lateral movement of the rigid portion of the divergent cone downstream therefrom.

3 Claims, 2 Drawing Figures

PATENTED OCT 10 1972

3,696,999

INVENTORS
STANLEY P. DESJARDINS
ALAN R. CANFIELD
BY JONATHAN W. WILSON

Edward E. McCullough
AGENT

MOVABLE THRUST NOZZLE FOR ROCKETS

This invention relates to thrust nozzles for rockets; and, more particularly, it relates to such nozzles wherein the thrust vector of the propulsive gases may be altered by moving a portion of the nozzle.

Although a great proliferation of ideas has been proposed for means of steering rockets, the most favored from a reliability point of view have included those wherein the thrust nozzle is moved or deformed in some way to alter the direction of the propulsive gases flowing therethrough. Inherent problems attending the use of moveable nozzles have always included (1) means of maintaining a constant seal between the nozzle and the rocket case, and (2) lightweight means for mounting the nozzle so that it may be moved according to some constant relationship to the rocket. The latter problem has been conventionally solved by the use of separate components such as gimbal rings for mounting a movable nozzle to a rocket. More recently, a considerable amount of weight has been saved by use of a flexible bearing between the rocket case and nozzle, so that the bearing not only permits movement of the nozzle but also acts as a seal. However, the flexible bearing in this adaption still constitutes a separate component contributing to the total weight of inert parts of the rocket.

The present invention represents a further advance in the art by incorporating the flexible bearing, not as a separate component but as an integral, annular portion of the divergent cone of the thrust nozzle. This permits thrust vector control by movement of a rigid portion of the divergent cone downstream of the flexible bearing. The sealing problem is automatically solved because the portion of the nozzle upstream of the bearing may be fixed to the rocket case; motion of the nozzle may be confined to rotation about a point in fixed relationship to the geometry of the rocket; and the bearing also functions as a portion of the divergent cone, presenting expansion surfaces to propulsive gases of the rocket. Also, because of its position in the nozzle, the bearing of the present invention is not subjected to the severity of temperatures and axial loads characteristic of the prior-art device.

An object of the invention is to provide a reliable, lightweight, low cost, thrust vector control nozzle for rockets.

Another object of the invention is to provide a movable nozzle that overcomes the problem of providing adequate gas seal between the nozzle and the rocket case.

Other objects and advantages of the invention will become apparent as it is disclosed in the following description and accompanying drawings wherein the same parts are designated by identical characters throughout the disclosure.

Figure 2:
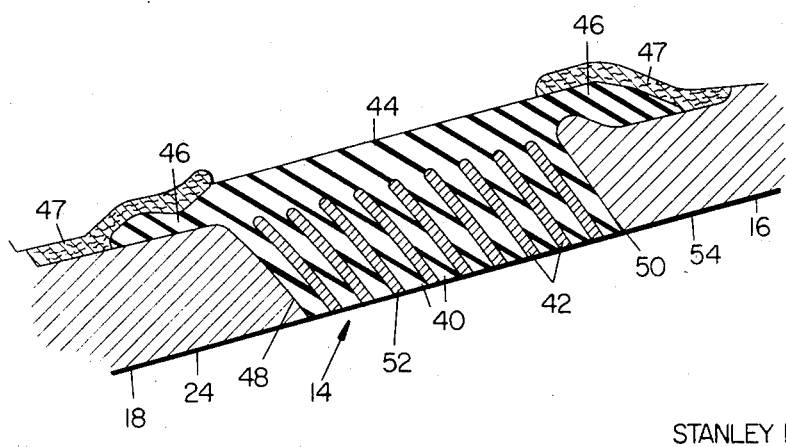

In the drawings:

FIG. 1 is a longitudinal section of the invention and a portion of a rocket in which it is installed; and FIG. 2 is an enlarged view of a portion of the thrust nozzle indicated in FIG. 1 by a dotted circle designated "2."

A preferred embodiment of the invention includes the rocket nozzle 10 in FIG. 1. It consists essentially of an annular body 12, an annular, flexible bearing 14, and a hollow, divergent cone 16. The interior surface 18 of the annular body 12 defines a convergent portion 20 upstream of the throat 22 and a divergent frustum 24 downstream thereof. The annular body 12 is fixed in sealed relationship to the small end 26 of an adapter cone 28. The large end 30 of the adapter cone 28 has a radially extending flange 32 with a plurality of holes 34 whereby it may be fastened to the rocket case 36 by screws 38. The adapter cone 28 is divergent at a greater angle than that of the nozzle 10 to provide room for the required degree of lateral motion of the nozzle 10 therein.

The bearing 14 is generally constructed of annular, calendered layers 40 of elastomer stacked alternately with and bonded to annular laminae 42 of some relatively rigid material having a low rate of thermal conductivity, such as carbon cloth filled with a phenolic resin. An annular outer wall 44 formed of a layer of elastomer bonded to the outer side of the bearing 14 extends beyond the bearing 14 at both ends thereof to provide flanges or beads 46 whereby it may be securely attached at one end to the annular body 12 and at the other to the hollow, divergent cone 16 with externally-wrapped material 47 such as fiberglass tape and/or roving impregnated with a resin. The inner end 48 of the bearing 14 is bonded to the annular body 12 and the outer end 50 is bonded to the hollow, divergent cone 16. The divergent frustum 24 of the annular body 12, the inner surface of the bearing 14, and the inner surface 54 of the divergent cone 16 are shaped to form a single, continuous, expansion surface for the propulsive gases of the rocket. Fluid operated actuators 56, attached at one end to the adapter flange 32 and at the other end by means of brackets to the hollow divergent cone 16, are provided to move the rigid divergent cone 16 laterally within the confines of the adapter cone 28 to provide thrust vector control for the rocket. Only one actuator 56 is shown. Attachments of the actuator 56 with the adapter flange 32 and the divergent cone 16 must be by universal joints, unless the divergent cone 16 is to be moved only in one plane. The layers 40 of elastomer and the laminae 42 conform to spherical surfaces concentric about the point P, which is the center of rotation for the divergent cone 16 when moved by the actuators 56. However, in some applications the dimensions of the layers 40 and the laminae 42 are such that the spherical surfaces are very closely approximated by conical surfaces. In such cases, these surfaces may be made conical to facilitate manufacture.

It may be noted that in addition to functioning as reinforcements and to making the bearing 14 relatively incompressible in an axial direction, the rigid laminae 42 also serve to protect the intervening layers 40 of elastomer from erosion by the high-velocity, high-temperature, propulsive gases of the rocket. It should also be noted that the outer wall 44 of elastomer is not essential to the functioning of the bearing 14 in the nozzle 10 and that many other ways can be devised for fastening the bearing 14 securely to adjacent parts of the nozzle 10.

As used herein, the term "rigid" in reference to the laminae 42 means unyielding relative to the layers 40 of elastomer.

An invention has been disclosed that constitutes an advance in the state of the art of thrust vector control nozzles for rockets. Although a preferred embodiment has been described with considerable specificity with regard to detail, such details may be altered without departing from the scope of the invention as defined in the appended claims.

What is claimed is:

1. In a rocket thrust nozzle that includes a hollow, divergent cone, the improvement comprising: an annular, flexible bearing fastened intermediately in said divergent cone as an integral part thereof, separating it into an upstream section and a movable downstream section relative to the flow of propulsive gases therethrough, said bearing comprising at least one rigid lamina and a layer of elastomer bonded on each side thereof, said layers and lamina being perpendicular to the axis of the nozzle to resist axial compressive loads on said movable downstream section but permitting lateral motion thereof, whereby actuators attached to the rocket may impress side forces on said nozzle downstream section to divert propulsive gases for steering.

2. The thrust nozzle of claim 1 wherein said annular, flexible bearing comprises layers of elastomer stacked alternately with and bonded to rigid laminae, said layers and laminae conforming to spherical surfaces concentric about a point of rotation for said hollow, divergent cone.

3. The thrust nozzle of claim 1 wherein said rigid laminae are made of carbon cloth filled with phenolic resin.

* * * * *